United States Patent [19]

Wagner et al.

[11] Patent Number: 6,080,317
[45] Date of Patent: Jun. 27, 2000

[54] PROCESS AND APPARATUS FOR THE PURIFICATION OF WASTE WATER

[75] Inventors: Friedrich Wagner, Heuweiler; Hubert Wienands, Emmendingen, both of Germany

[73] Assignee: Wehrle-Werk AG, Emmendingen, Germany

[21] Appl. No.: 08/853,693

[22] Filed: May 9, 1997

[30] Foreign Application Priority Data

May 10, 1996 [EP] European Pat. Off. ............. 96107442

[51] Int. Cl.[7] .................................................. B01D 61/00
[52] U.S. Cl. ......................... 210/652; 210/650; 210/636; 210/660; 210/663; 210/195.2; 210/257.2
[58] Field of Search .................................... 210/652, 636, 210/660, 663, 650, 195.2, 723, 257.2, 651

[56] References Cited

U.S. PATENT DOCUMENTS

| | | | |
|---|---|---|---|
| 3,839,206 | 10/1974 | Welch | 210/259 |
| 4,276,177 | 6/1981 | Smith | 210/195.2 |
| 4,434,057 | 2/1984 | Marquardt | 210/652 |
| 4,784,771 | 11/1988 | Wathen et al. | 210/257.2 |
| 4,814,088 | 3/1989 | Kutowy et al. | 210/651 |
| 5,112,489 | 5/1992 | Hartmann | 210/195.2 |
| 5,362,395 | 11/1994 | Dorau et al. | 210/651 |

FOREIGN PATENT DOCUMENTS

| | | | |
|---|---|---|---|
| 0 379 040 | 7/1990 | European Pat. Off. | C02F 1/44 |
| 0 503 649 | 9/1992 | European Pat. Off. | C02F 3/12 |
| 38 15 271 | 11/1989 | Germany | C02F 9/00 |
| 41 18 088 | 12/1992 | Germany | C02F 1/00 |
| 195 08 786 | 9/1995 | Germany | C02F 11/00 |

OTHER PUBLICATIONS

European Search Report of Corresponding Application, EP 96 10 7442 of Oct. 11, 1996.
Derwent Abstract of DE 195 08 786.
Derwent Abstract of DE 41 18 088.
Derwent Abstract of EP 0 379 040.

*Primary Examiner*—Ana Fortuna
*Attorney, Agent, or Firm*—Darby & Darby

[57] ABSTRACT

A process and apparatus for the purification of waste water includes a nano-filteration stage (19) which returns a stream of retained substance (20) in a cycle (15, 16, 17, 18) in order to effect a concentration of the content substances. Concentrate (29) is taken out of the cycle and is introduced into a physical and/or chemical treatment stage. At least a part of the treated concentrate (47) is returned into the cycle of the nano-filtration stage (19).

19 Claims, 1 Drawing Sheet

PROCESS AND APPARATUS FOR THE PURIFICATION OF WASTE WATER

BACKGROUND OF THE INVENTION

1. Field of the Invention

The present invention relates to a process for the purification of waste water, wherein the waste water is fed into a cycle of a filtration stage, the cycle taking the retained matter of the filtration stage back to its inlet point whereby a concentrate is set up in the filtration cycle, and wherein concentrate is taken out of the filtration cycle and is further introduced into a treatment stage for physical and/or chemical treatment; and it also relates to an apparatus that is suitable for carrying out this process.

2. Description of the Related Art

In a known process of this kind (EP 0 503 649 A1), the concentrate after having been subjected to the physical and/or chemical treatment is introduced into a biological reactor upstream of the filtration stage, which also receives the incoming waste water for the purpose of biological treatment. Already from this known process very good treatment results can be expected.

SUMMARY OF THE INVENTION

1. Summary of the Process

Set against this background, an objective of the present invention is to further develop a process of the kind that was named at the beginning, with the aim of attaining an additional increase in efficiency, and to specify an apparatus suitable for carrying out this process.

According to the invention, this objective is accomplished with regard to the process by reintroducing at least part of the treated concentrate out of the physical and/or chemical treatment stage back into the filtration cycle.

The process according to the invention proves particularly advantageous in comparison to EP 0 503 649, if only insignificant amounts or none of the biologically treatable content substances are left in the treated concentrate; respectively, if the concentrate contains substances which accumulate in the biological reactor (refractory substances).

The immediate reintroduction of the treated concentrate to the inlet point of the filtration stage relieves the load on the biological purification stage hydraulically and prevents the accumulation of refractory substances.

There is a further advantage in that waste waters with a lesser degree of organic pollution, according to the inventive process may be purified effectively even without a biological treatment stage.

In the process according to the invention, through the formation of a concentrate in the cycle of the filtration stage, the noxious content substances in the waste water are being concentrated to a degree where, through physical and/or chemical treatment, they can be effectively removed, respectively converted or brought into another form in which they can easily be separated. It should be noted in particular that the concentration and removal of the waste water content substances is independent of a biological pretreatment.

Because the speed of the physical and chemical reactions in waste water treatment plants depends on the concentration, the reaction times will be long or a large excess amount of chemicals will be required, if the residual concentrations of waste water content substances in the reaction chamber are set low in order to meet the targeted level of purification. In the process according to the invention this adverse coupling between the level of purification and the reaction kinetics has been eliminated in that the retentive capability of the filtration stage for certain substances is utilized to obtain a high degree of purification in the permeant water, the quality of which is largely independent of pre-treatment stages or of the treatment of the concentrate. By concentrating the content substances retained in the concentrate, the conversion of these content substances in the physical and/or chemical treatment stage at a high reaction speed is exceptionally efficient, so that the conversion and separation of the content substances at this point in the process are extremely effective.

It is particularly advantageous to perform the process of concentration through filtration in a membrane filter device, preferably a nano-filtration device. Thereby, a nearly total retention of organic content substances as well as a partial retention of polyvalent ions are accomplished, so that the permeant liquid carries away only content substances in low-molecular solution, primarily salts. The retention and the efflux may be varied through a suitable design of the filtration stage and of the physical and/or chemical treatment stage. The retentivity for inorganic content substances is limited by the substance-specific effectiveness of the physical and/or chemical treatment stage which is used to remove these substances from the concentrate.

A particularly high purification effect is achieved if the process of concentration is performed through a plurality of sequentially arranged membrane filter devices, preferably nano-filtration devices.

It has proven particularly effective to treat the concentrate in the physical and/or chemical treatment stage with an adsorption agent and/or an oxidation agent and/or a flocculation agent and/or a precipitation agent and/or an ion exchange agent. The sludge or granulate which is produced as a result of adsorption, flocculation, precipitation, or ion exchange, respectively, and in which the content substances of the concentrate are bound, can thereby be effectively removed in the physical and/or chemical treatment stage. In this manner it is possible to concentrate dissolved or dispersed persistent substances in the waste water that is to be treated, which substances may be organic matter, but also heavy metals and polyvalent ions, and to return the liquid phase to the filtration stage for further treatment, as well as to convert these noxious content substances into a separable form and thereby to remove them from the waste water.

In a practical form of carrying out the process according to the invention, the separation effectiveness of the physical and/or chemical treatment stage is adjusted to such a level that the returned portion of the treated material will not raise the degree of concentration in the filtration cycle above a desired limit. Alternatively, the volume of the portion returned to the filtration cycle may be adjusted such that the degree of concentration in the filtration cycle does not exceed a desired level. By regulating the concentration in this manner, the concentrate which has been treated in the physical and/or chemical treatment stage can be immediately returned to the filtration stage. To monitor the properties of the concentrate it is practical to use continuous conductivity determination, turbidity measurement, or an analyzer.

The process of concentrating the concentrate in the filtration cycle as well as the physical and/or chemical treatment of the concentrate can be performed in a discontinuous or continuous manner. Of particular advantage is the continuous concentration as well as the continuous physical and/or chemical treatment of the concentrate taken out of the filtration cycle, which is especially beneficial when a plurality of sequentially arranged filtration devices are used.

The preferred method of regenerating the filtration device that is serving for the process of concentration is to provide rinse cycle intervals.

2. Summary of the Apparatus

An apparatus for the purification of waste water designed in accordance with the invention has a filtration stage, connected to which is a filtration cycle serving to return the retained substance back to the inlet of the filtration stage and thereby to generate a concentrate, into which filtration cycle the waste water is introduced; and the apparatus further has a physical and/or chemical treatment stage, an inlet of which is connected to the filtration cycle, while an outlet of the same treatment stage, draining at least a part of the treated concentrate from it, is connected to the filtration cycle.

Due to the different degrees of retentivity for the content substances in waste water in the filtration stage which, in particular, is a membrane filter device and, with special preference, a nano-filter device, the reaction times for the respective content substances in the physical and/or chemical treatment are decoupled from each other. Thereby it becomes possible to individually adapt the reaction time for each substance to the amount of time required for its reduction to the desired minimum level of concentration.

Preferably, the physical and/or chemical treatment stage is equipped with an adsorption device and/or a flocculation device and/or a precipitation device and/or an ion exchanger, for the separation of content substances of the concentrate. Hereby the concentrate, e.g., in a reaction vessel, is bound adsorptively as with activated carbon or bentonite, or with a flocculation and/or precipitation agent, or ion-selectively by means of an ion exchange agent, and is removed from the physical and/or chemical treatment stage.

The process according to the invention and the inventive apparatus are applicable in industry, primarily for the purification of waste waters that are polluted with content substances that are difficult or impossible to break down through biological treatment.

Other characteristics, details and advantages of the invention will become evident from the following description of an embodiment, wherein the invention is explained in more detail by referring to the drawing.

BRIEF DESCRIPTION OF THE DRAWING

The drawing shows a schematic representation of an apparatus for carrying out the process according to the invention, with a filtration stage serving to separate and concentrate the content substances of the waste water, and a treatment stage for the physical and/or chemical treatment of the concentrate.

DETAILED DESCRIPTION OF THE PREFERRED EMBODIMENTS

Figure 1:
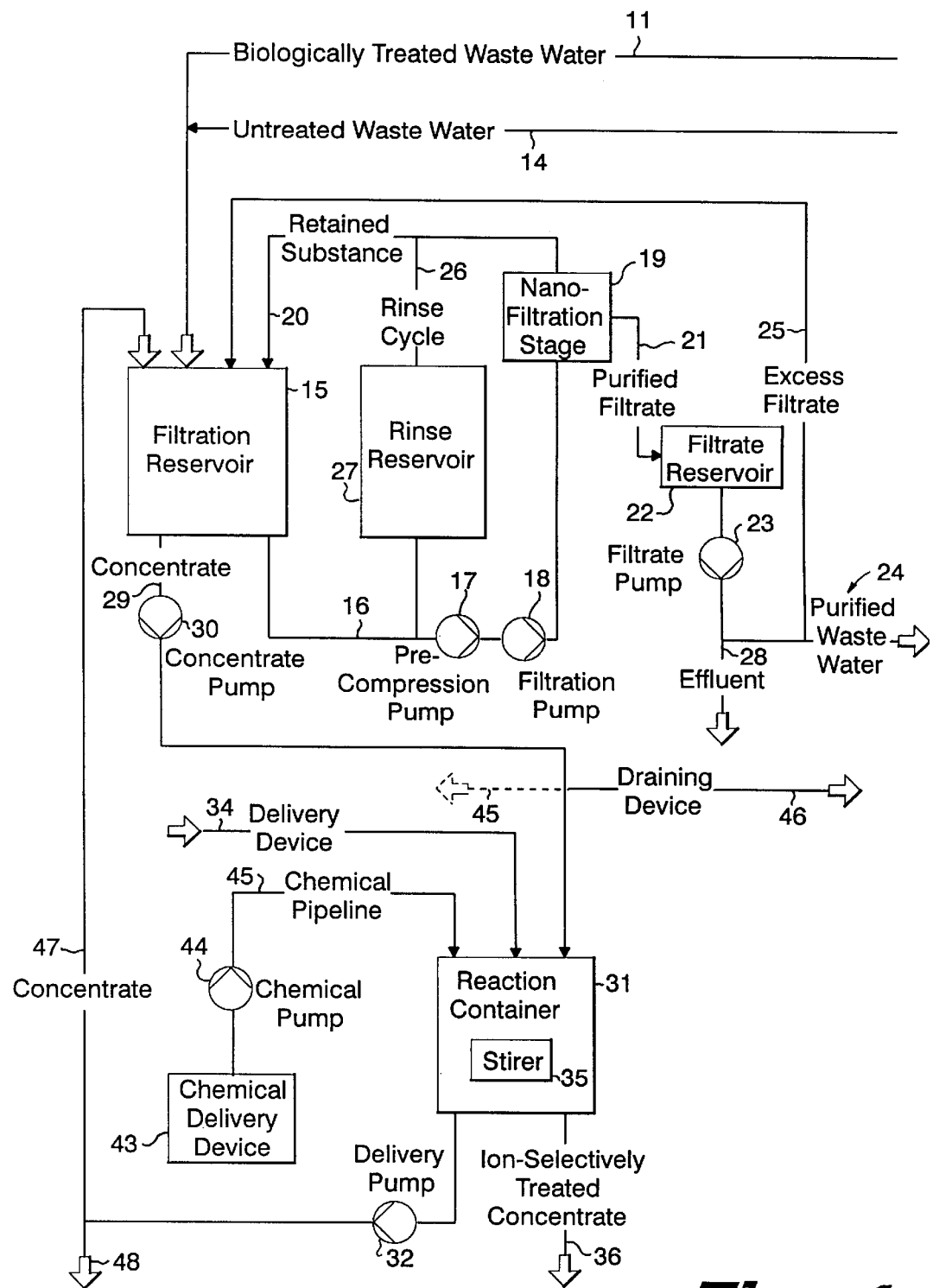

As can be seen in the one FIGURE of the drawing, the waste water to be treated is introduced into a nano-filtration stage, either as biologically pre-treated waste water 11 or as entirely untreated waste water 14.

The biologically pre-treated (11) or untreated (14) waste water is first introduced to a filtration reservoir 15, wherein a concentration is effected by pumping its contents 16 through a pre-compression pump 17 and a filtration pump 18 to the inlet of a nano-filtration stage 19. The nano-filtration stage 19 contains a semi-permeable membrane of a kind which is permeable to a considerable extent only for salts. The nano-filtration stage 19, as an example, is of such a kind that 30 to 90% of the NaCl contained in the waste water is held back. The retained substance 20 of the nano-filtration stage 19 is reintroduced into the filtration reservoir, whereby a filtration cycle is formed which contains the nano-filtration stage 19 and the filtration reservoir 15.

In this manner, content substances are held back in the nano-filtration device in the stream of retained matter and are being concentrated, while the purified filtrate 21 is collected through a filtrate reservoir 22. Depending on requirements, the filtrate stream is controlled in different ways by means of a filtrate pump 23 and valve controls.

When the filtrate meets the purification requirements, it can be drained from the apparatus as purified waste water 24. Since the filtrate production rate is set in such a manner that the output of filtrate is more than the volume that is introduced into the apparatus as feed supply 11 or 14, respectively, the excess filtrate 25, for operational reasons, has to be returned to the filtration reservoir 15. When the targeted level of concentration in the filtration reservoir 15 has been attained, which may be monitored, e.g., continuously through conductivity and turbidity measurements or by means of an automatic analyzer, then the concentrate is brought to a chemical and/or physical treatment stage either discontinuously, respectively in batches, or continuously through a branch stream as concentrate 29, by means of a concentrate pump 30.

When the filtration performance of the nano-filtration stage 19 declines, then the filtration stage, by means of a rinse cycle 26 which is supplied from the rinse reservoir 27 with water or filtrate containing a cleaning agent, can be rinsed clear through a corresponding setting of the valve controls.

If the filtrate 24 does not meet the purification requirements, then the effluent 28 of the nano-filtration stage can be introduced into an additional nano-filtration stage.

The nano-filtration stage 19 is designed for the process in accordance with the invention, e.g., with nano-filtration modules, in such a manner that a nearly total retention of all relevant content substances is accomplished, so that only content substances in low molecular solution, primarily salts, are carried away in the treated waste water.

The concentrate pump 30 pumps the concentrate 29 into a reaction container 31 of the physical and/or chemical, respectively ion-selective, treatment device. A chemical pump 44 is connected to the reaction container 31 via a chemical pipeline 45, so that flocculation or precipitation reagents or other materials for the chemical or physical treatment of the concentrate 29 can be delivered from a chemical delivery device 43 Suitable substances of this kind include particularly the customary flocculation and precipitation agents, adsorption agents such as activated carbon, bentonite, ion exchanger resins or similar substances. For a treatment that serves to oxidize the concentrate 29, oxidation agents such as ozone, $H_2O_2$ and the like may be used. Further, the oxidation may take place under UV radiation or through electrolysis. Chemicals or treatment agents of the kinds mentioned may also be delivered via a delivery device 34 to the reaction container 31. Through the aforementioned substances it is possible to adsorb adsorbable persistent and ion-selective substances, to convert them into a separable form and remove them, so that the concentrate 47, purged of noxious substances, can be sent from an outlet of the reaction container 31 by way of a delivery pump to the filtration reservoir 15. In addition to this, the reaction container 31 may be agitated by means of a stirrer 35, and the adsorbed or chemically bound content substances, brought into concentrate form through sedimentation or filtration, may subsequently be carried out of the system at 36.

In the case of a merely partial reintroduction of the treated concentrate 47 into the filtration cycle, a branch stream of the untreated concentrate 29 may be drawn off directly by a draining device 45, 46, or alternatively, it may be removed from the apparatus at 48, subsequent to chemical and/or physical, respectively ion-selective, treatment.

In the case of continuous operation, the concentrate 47, after treatment in the physical and/or chemical treatment device, can be reintroduced via the delivery pump 32 into the filtration cycle containing the membrane or nano-filtration stage. In this manner, the treatment stages can be joined into a quasi-closed loop effecting a continuous treatment of the waste water to be purified which is introduced at 11/14.

The products resulting from this continuous treatment are discharged at the respective treatment stage, namely the purified waste water from the nano-filtration stages at 24 and 28, as well as the chemically and/or physically, respectively ion-selectively treated concentrate at 36, whereby on the detail level, however, this depends on the selected modalities of the process.

What is claimed is:

1. A process for purification of untreated waste water, comprising the steps of
    (1) providing a filtration cycle by
        (a) feeding the untreated waste water (11, 14) through a reservoir (15) into an intake of a filtration stage (19);
        (b) filtering the untreated waste water through the filtration stage (19), separating the untreated waste water into filtered waste water (21) and retained waste substrate (20);
        (c) recycling the retained waste substrate (20) back into the reservoir (15), forming a concentrate (29); and
    (2) providing a treatment cycle by
        (d) feeding the concentrate (29) from a discharge side of the reservoir (15) into a reaction container (31) to produce a treated concentrate;
        (e) recycling a first portion (47) of the concentrate treated in step (d) back into the reservoir (15), whereby the first portion of the treated concentrate is returned to the filtration cycle.

2. The process according to claim 1, further comprising a step of
    (f) converting a second portion of the treated concentrate into a separable form and removing the separable form from the reaction container (31).

3. The process according to claim 2, further comprising a step of
    (g) controlling the efficiency of converting the second portion of the treated concentrate into a separable form such as to maintain a level of concentration below a predetermined level of concentration in the concentrate (29).

4. The process according to claim 1, further comprising a step of
    (h) controlling the recycled first portion (47) of the treated waste water such as to maintain a concentration level below a predetermined level in the concentrate (29).

5. The process according to claim 1, wherein the filtration stage comprises a membrane filter.

6. The process according to claim 5, wherein the membrane filter is a nano-filter.

7. The process according to claim 6, wherein the waste water comprises dissolved NaCl and the nano-filter has a retentivity of 30 to 70% for NaCl.

8. The process according to claim 6, wherein the waste water comprises dissolved NaCl and the nano-filter has a retentivity of 50 to 90% for NaCl.

9. The process according to claim 6, wherein the waste water comprises dissolved NaCl and the nano-filter has a retentivity of 10 to 30% for NaCl.

10. The process according to claim 1, wherein the concentrate (29) in the treatment stage (31) is treated with at least one treatment agent selected from the group consisting of an adsorption agent, oxidation agent, flocculation agent, precipitation agent, and ion exchange agent.

11. The process according to claim 1, wherein forming the concentrate (29) in the filtration cycle and feeding the concentrate into the reaction container are performed discontinuously.

12. The process according to claim 1, wherein forming the concentrate (29) in the filtration cycle and feeding the concentrate into the reaction container is performed continuously.

13. The process according to claim 1, further comprising a step of rinsing the filtration stage (19) at intervals for regenerating the filtration stage.

14. An apparatus for the purification of waste water, comprising:
    a reservoir (15) having a waste water inlet (11, 14);
    a filtration stage (19) having a membrane filter, said filtration stage being connected to said reservoir by a first conduit through which the waste water is supplied to said filtration stage, an by a first recirculation conduit through which retained substances (20) extracted from the waste water by said filtration stage (19) are fed back to said reservoir (15); and
    a reaction container (31) connected to said reservoir (15) by a second conduit through which concentrate (29) from said reservoir (15) is supplied to said reaction container (31) by a second recirculation conduit through which treated concentrate (47) produced by said reaction container (31) is fed back to said reservoir (15).

15. The apparatus according to claim 14, wherein the membrane filter is a nano-filter.

16. The apparatus according to claim 14, wherein the reaction container (31) includes an adsorption device.

17. The apparatus according to claim 14, wherein the reaction container (31) includes a separator for separating content substances of the concentrate; selected from the group that consists of flocculation and precipitation devices.

18. The apparatus according to claim 14, wherein the reaction container (31) comprises at least one of a physical and chemical waste water treatment assembly and an ion exchanger.

19. The apparatus according to claim 1, wherein the reaction container (31) includes an oxidation device.

* * * * *